United States Patent [19]

Hachiya et al.

[11] Patent Number: 5,370,888
[45] Date of Patent: Dec. 6, 1994

[54] PROCESS FOR THE MANUFACTURE OF CHOCOLATE CONFECTIONARY BY ENTRAPPING A FATTY CREAM WITH FINE GAS BUBBLES THEREIN

[75] Inventors: Iwao Hachiya; Tetsuo Koyano; Mitsuo Yamaguchi, all of Sakado, Japan

[73] Assignee: Meiji Seika Kaisha, Ltd., Tokyo, Japan

[21] Appl. No.: 183,248

[22] Filed: Jan. 19, 1994

Related U.S. Application Data

[63] Continuation of Ser. No. 802,965, Dec. 6, 1991, abandoned.

[30] Foreign Application Priority Data

Dec. 10, 1990 [JP] Japan ................................. 2-407150
Apr. 22, 1991 [JP] Japan ................................. 3-116678

[51] Int. Cl.$^5$ ............................................. A23G 9/20
[52] U.S. Cl. ................................. 426/282; 426/103;
426/294; 426/302; 426/303; 426/306; 426/307;
426/312; 426/512; 426/513; 426/514; 426/564;
426/572; 426/659; 426/660
[58] Field of Search ............... 426/103, 282, 294, 302,
426/303, 306, 307, 312, 564, 572, 659, 660, 512,
513, 514

[56] References Cited

U.S. PATENT DOCUMENTS 3,894,159 7/1975 Franta ................................. 426/284

FOREIGN PATENT DOCUMENTS

| 50-35093 | 6/1983 | Japan . |
| 58-107136 | 6/1983 | Japan . |
| 63-49040 | 3/1988 | Japan . |
| 1305520 | 2/1973 | United Kingdom ................ 426/572 |

Primary Examiner—Helen Pratt
Attorney, Agent, or Firm—Nikaido Marmelstein Murray & Oram

[57] ABSTRACT

A process for the manufacture of chocolate confectionery by entrapping a fatty cream with fine gas bubbles. The confectionery is manufactured by preparing a shell chocolate with open end in a mold, feeding under pressure a fine gas bubble entrapping fatty cream base into the shell chocolate through the opening to fill the shell, scraping off excessively charged fatty cream, solidifying the fatty cream in the shell, pouring a chocolate base on the solidified fatty cream to close the opening of the shell chocolate, scraping off excessively charged chocolate base, solidifying the chocolate base, and demolding the product. A stencil plate can be used, when the gas bubble entrapping fatty cream is charged into the shell of shell chocolate.

11 Claims, 5 Drawing Sheets

PROCESS FOR THE MANUFACTURE OF CHOCOLATE CONFECTIONARY BY ENTRAPPING A FATTY CREAM WITH FINE GAS BUBBLES THEREIN

This application is a continuation of application Ser. No. 7/802,965, filed Dec. 6, 1991, now abandoned.

BACKGROUND OF THE INVENTION

1. Field of the Invention

The present invention relates to a process for the manufacture of a chocolate confectionery entrapping fatty cream with fine gas bubbles therein, and more particularly to that showing good melt in the mouth, and with smooth and light taste.

2. Related art

In general, a chocolate confectionery entrapping gas bubbles therein and another chocolate confectionery, wherein gas bubble entrapping cream of mainly w/o emulsion type, comprising a fruit paste and fresh cream and adjusted water or moisture content to about 8% by weight or more less (herein after referred to merely as "the chocolate confectionery") are chocolate confectionery products favorably noticed by consumers, since those show nice melt in the mouth and light taste.

As a process for manufacturing such a chocolate confectionery, for instance, there is a process comprising steps of preparing a fatty cream base with gas bubbles therein, and filling the cream base in constant amount to an inner space of a shell chocolate.

In this case, according to the process disclosed in Jap. Pat. No. Sho 63-49040(A), the chocolate confectionery is manufactured by feeding under pressure an inert gas such as air, nitrogen or the like gas to a fat and oil dough with use of a cooling and stirring type continuous gas dispersing machine to continuously prepare a fat and oil dough with gas bubbles therein.

There is also another process, wherein a fatty cream base is previously charged in inner space of a shell chocolate, the shell chocolate with the fatty cream the rein is transferred into a reduced chamber to cause an inflation or expansion of very fine bubbles dispersing in the fatty cream base and to make the cream base having porous honeycomb structure, cooling the fatty cream base in the shell chocolate to cause solidification thereof under reduced pressure, scraping off, if necessary, an excess part of the solidified fatty cream, and then charging a molten chocolate base on the surface of the solidified fatty cream, in a conventional manner to form a bottom of the shell chocolate [Jap. Pat. No. Sho 60-35093(B)].

The process as disclosed in said Jap. Pat. No. Sho 63-49040(A) utilizes such a characteristic of the fat and oil dough that a partial crystallization of fatty components therein causes a gas bubbling in great extent, and is excellent in that a fat and oil dough entrapping gas bubbles of fine and uniform in size can easily be prepared. Namely, the fat and oil dough entrapping gas bubbles therein, which has a specific gravity of about 0.35–0.80 and bubbles of 0.3 mm or more less in diameter can be continuously prepared, when the cooling and stirring type continuous gas dispersing machine shall be employed, as disclosed in Jap. Pat. No. Sho 63-49040(A). However, this process has a disadvantage if used with a fatty cream base, in that a tapping operation is required for the fine gas entrapping fatty cream base charged in the shell chocolate to make flat the top surface of the charged fatty cream base, since the gas bubble entrapping fatty cream base shows almost no fluidity, but a shock or vibration due to the tapping operation causes a partial consolidation of gas bubbles to make the same larger and a partial escape of the gas entrapped in the fatty cream base to increase its specific gravity, so that the filling in constant amount by a conventional piston type or stencil type filling machine becomes difficult. Namely, a friction and other factors at the part of piston, nozzle or stencil increase specific gravity of the fatty cream base by 0.30–0.50% than that of intrinsic value thereof to sacrifice in some extent of the light taste which is one of excellent characteristics of the fatty cream.

While, according to the process as disclosed in Jap. Pat. No. Sho 60-35093(B), the fatty cream base should be subjected to a reduced pressure for forming the porous structure, and then cooling to solidify the same in such an extent under the reduced pressure condition that the porous skeleton shall not be damaged, when the reduced pressure is released and thus a complicate and larger size apparatus is required. Further, this process has a disadvantage that size of gas bubbles to be formed has almost no correlation to an extent of reducing pressure and a sudden inflation or swelling shall occur, when the pressure is reduced to reach a value overcoming the viscosity resistance of fatty cream base and thus size of the formed gas bubbles becomes larger (0.6–1.5 mm), and as a result, the solidified fatty cream entrapping such gas bubbles therein shows rough feeling in the mouth to cause a problem in quality.

SUMMARY OF THE INVENTION

For developing a process for the manufacture of a chocolate confectionery entrapping fatty cream with fine gas bubbles therein, which will dissolve various problems encountered in the conventional processes, and can be operated with good efficiency to provide products of nice quality, the inventors have studied and investigated to initially find out that gas bubble entrapping fatty cream can be charged into inner space of a shell chocolate in constant amount and with almost no change in specific gravity of a gas entrapping fatty cream base, by continuously preparing the gas entrapping fatty cream base of 0.35–0.80 in its specific gravity and 0.3 mm or more less in size of gas bubbles, with use of the cooling and stirring type continuous gas dispersing machine as employed for the process as disclosed in said Jap. Pat. No. Sho 63-49040(A), and feeding under pressure to charge the same in the space of shell chocolate. The inventors have further investigated by taking such findings into consideration to finally establish the invention.

According to the invention, such processes for the manufacture of chocolate confectionery entrapping a fatty cream with fine gas bubbles therein are provided a) that comprising steps of continuously feeding under pressure a fatty cream base with uniformly dispersed fine gas bubbles therein to charge the same into a shell of shell chocolate which is previously formed by adhering a molten chocolate base on an inner wall of a mold and causing solidification thereof, removing excessively charged fatty cream base from the shell, charging a molten chocolate base on the fatty cream base in the shell to form a bottom of the shell, removing excessively charged chocolate base, and cooling to cause a solidification thereof, and b) that comprising steps of continuously feeding under pressure a gas bubble entrapping fatty cream base which was prepared by uniformly dispersing fine gas bubbles with use of a cooling and stirring type continuous gas dispersing machine, to charge the same in a shell of shell chocolate which is previously formed by adhering a molten chocolate base on inner wall of a mold and causing solidification thereof, through an aperture of a stencil plate so placed that the aperture is fitted to an opening in shell of the shell chocolate, scraping off the charged gas bubble entrapping fatty cream in a constant depth to make flat the top surface of the charged fatty cream, removing the stencil plate from the mold, charging a molten chocolate base on the fatty cream base in the shell to form a bottom of the shell, scraping off excessively charged chocolate base, and then, in accordance with conventional manner, cooling to cause solidification thereof, and demolding the product.

As the gas to be uniformly dispersed in the fatty cream base for carrying out the process of the invention, any of them not affecting quality of the fatty cream and health of human may be selected, for instance, air, nitrogen gas, carbon dioxide gas and the like can be exemplified.

As the fatty cream base for carrying out the process of invention, such fatty cream is employed as the fatty cream per se having a fat content of 35–50% by weight and prepared by composing in a suitable ratio cocoa butter, cocoa butter equivalent (CBE) or the like fat containing in high ratio fats in solid state at room temperature and sharply melting at temperature near human body one (that is the like vertical type fat) and milk fat, shortening or the fat containing in lower ratio the fats in solid state at room temperature, having a lower melting point and sorry texture (that is the like horizontal type fat) or a modified fatty cream to be prepared by adding to the fatty cream a fresh cream and/or concentrated fruit juice or puree in such an extent that w/o emulsion type properties thereof can be maintained, namely the modified fatty cream having water or moisture content of about 10% by weight or more less.

For carrying out the process of the invention, in the first place, the fatty cream base was continuously supplied in constant amount to the cooling and stirring type continuous gas dispersing machine which has been cooled by circulating a coolant through a jacket thereof, the gas was concurrently and continuously charged under pressure to the gas dispersing machine to uniformly disperse the gas as fine bubbles in the fatty cream, and then the resulting fine gas bubble entrapping fatty cream is fed under pressure to a portion near an inner shell surface of the shell chocolate by a pipe connected to a discharging port of a mixer in the gas dispersing machine. In this case, the cooling temperature and gas charging rate are determined by taking following factors into consideration, namely the temperature of the fatty cream per se at the time of supply, ratio of the fat containing in high ratio fats in solid state at room temperature and sharply melting at temperature near human body one and the fat containing in lower ratio the fats in solid state at room temperature, having a lower melting point and softy texture in the fatty cream, an extent of heat generation due to revolution of the mixer, specific gravity to be set for the gas bubble entrapping fatty cream which is to be formed. The gas bubble entrapping fatty cream prepared in such a way has the specific gravity of about 0.35–0.80, and diameter of each bubbles is about 0.3 mm or more less to show such a state that such fine gas bubbles uniformly disperse. In case of preparing the gas bubble entrapping fatty cream by charging the gas in said manner, it is quite difficult to adjust the specific gravity thereof at the level less than 0.35, in view of operations of the machine and the value of specific gravity higher than 0.85 is not preferable, since the fatty cream with such a high specific gravity gives a viscous feeling in the mouth similar to conventional fatty creams and the desired light taste loses. While, desired smooth and creamy taste of the fatty cream remarkably decrease, if it entraps gas bubbles with diameter of about more than 0.3 mm, and thus it is preferable to make the diameter of the gas bubbles of about 0.3 mm or less.

BRIEF DESCRIPTION OF DRAWINGS

FIGS. 1A–1G show manufacturing steps for the first embodiment of the process according to the invention, wherein FIG. 1A is a section showing a state that a gas bubble entrapping fatty cream base is being charged into a shell of a shell chocolate which was previously prepared by adhering a molten chocolate base on inner wall of a mold and cooling to cause solidification thereof; FIG. 1B is a section showing a state that the charging of the gas bubble entrapping fatty cream into the shell has been completed; FIG. 1C is a section showing a state that an excess amount of the charged gas bubble entrapping fatty cream is being scraped off with use of a scraper; FIG. 1D is a section showing a state that the scraping operation has been completed; FIG. 1E is a section showing a state that a molten chocolate base was charged on flat surface of the gas bubble entrapping fatty cream to form a bottom of the shell; FIG. 1F is a section showing a state that an excess amount of the charged chocolate base is being scraped off with use of a scraper; and FIG. 1G is a section showing a state that the scraping operation has been completed;

FIGS. 2A–2G show manufacturing steps for the second embodiment of the process according to the invention, which are similar to those in FIG. 1A–1G and wherein FIG. 2A is a section showing a state that a gas bubbles entrapping fatty cream base is being charged through an aperture of a stencil plate into a shell of a shell chocolate which was previously prepared by adhering a molten chocolate base on inner wall of a mold and cooling to cause solidification thereof; FIG. 2B is a section showing a state that the charging of the gas bubble entrapping fatty cream into the shell has been completed; FIG. 2C is a section showing a state that an excess amount of the charged gas bubble entrapping fatty cream is being scraped off with use of a scraper; FIG. 2D is a section showing states that the scraping operation has been completed, and that the stencil plate is being removed; FIG. 2E is a section showing a state that a molten chocolate base was charged on flat surface of the gas bubble entrapping fatty cream to form a bottom of the shell; FIG. 2F is a section showing a state that an excess amount of the charged chocolate base is being scraped with use of a scraper; and FIG. 2G is a section showing a state that the scraping operation has been completed;

FIGS. 3A–3D show manufacturing steps for the third embodiment of the process according to the invention, wherein FIG. 3A is a section showing a state that a gas bubble entrapping fatty cream base is being adhesively charged into a shell of a shell chocolate which was previously prepared by adhering a molten chocolate base on inner wall of a mold and cooling to cause solidification thereof is placed in the mold in the reversed state; FIG. 3B is a section showing a state that the charging of the gas bubble entrapping fatty cream into the turned shell has been completed; FIG. 3C is a section showing a state that an excess amount of the charged gas bubble entrapping fatty cream is being scraped off with use of a scraper; and FIG. 3D is a section showing a state that the scraping operation has been completed;

FIGS. 4A-4D show manufacturing steps for the fourth embodiment of the process according to the invention, which are similar to those In FIGS. 3A-3D and wherein FIG. 4A is a section showing a state that a gas bubble entrapping fatty cream base is being adhesively charged through an aperture of a stencil plate into a shell in reversed state of a shell chocolate which was previously prepared by adhering a molten chocolate base on inner wall of a mold and cooling to cause solidification thereof; FIG. 4B is a section showing a state that the charging of the gas bubble entrapping fatty cream into the shell has been completed; FIG. 4C is a section showing a state that an excess amount of the charged gas bubble entrapping fatty cream is being scraped off with use of a scraper; and FIG. 4D is a section showing states that the scraping operation has been completed, and that the stencil plate is being removed.

DETAILED DESCRIPTION OF PREFERRED EMBODIMENTS

The invention will now be explained in more detail with reference to drawings.

Figure 1A:
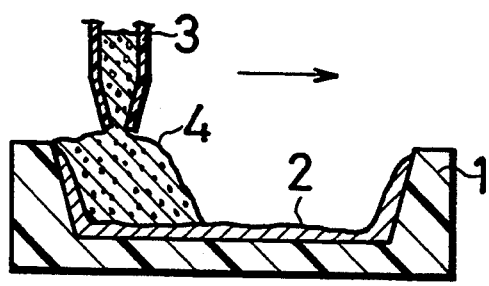
Figure 1B:
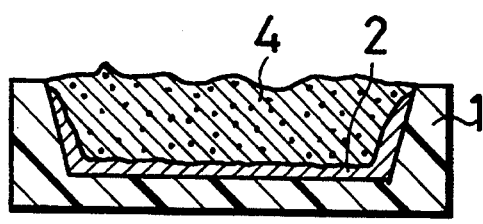

In the first place, a gas bubble entrapping fatty cream base 4 is charged under pressure, as shown in FIG. 1A, into a shell of a shell chocolate 2 which was previously formed by adhering a molten chocolate base on inner wall of a mold 1 and cooling the same to cause solidification thereof, with use of a nozzle 3 and if necessary, while moving the nozzle. The inner space of shell chocolate 2 is filled with the fatty cream base 4 (see FIG. 1B). This operation makes unnecessary the tapping operation which has been carried out in a convention process. The elimination of tapping operation is quite preferable, since, if such a tapping operation as accompanying a shearing force over a yield value of the gas bubble entrapping fatty cream shall be carried out by mistake, the fatty cream will suddenly be fluidized, so that fine bubbles dispersed in the fatty cream consolidate to form larger gas bubbles, and some of gas escapes from the fatty cream to destroy in some extent the desired fine and uniform porous structure of the gas bubble entrapping fatty cream.

On the other hand, according to the process of invention, the tapping operation is not carried out. Therefore, the gas bubble entrapping fatty cream base 4 is charged into the shell chocolate 2 while maintaining the uniform porous structure in a state just after the preparation thereof in the cooling and stirring type continuous gas dispersing machine or the like, so that there is almost no change in its specific gravity.

Figure 1C:
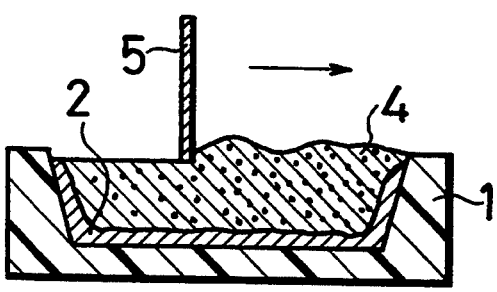
Figure 1D:
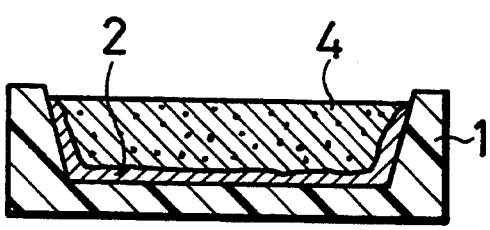
Figure 1E:
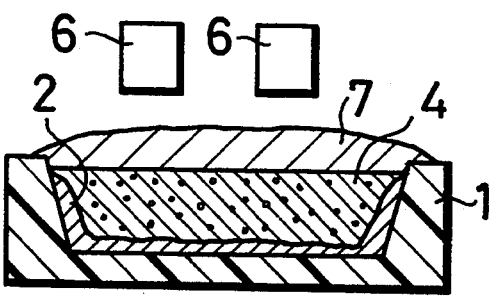
Figure 1F:
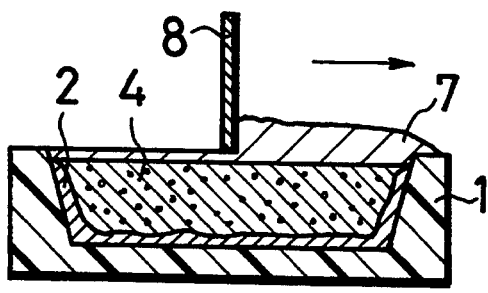
Figure 1G:
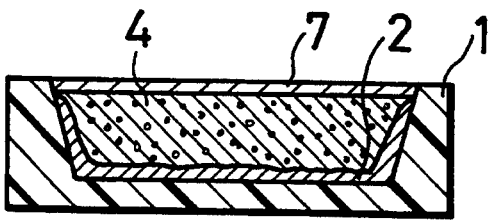

Then an excess amount of the gas bubble entrapping fatty cream base is scraped off with use of a scraper 5 (FIGS. 1C and 1D). The mold is transferred to a cooling device to cause solidification of the fatty cream charged in the shell chocolate. For increasing adhesiveness between the shell chocolate and a bottom chocolate, thereafter, end portion or edge area at open side of the shell chocolate is partially molten with use of a heater, and then a molten chocolate base 7 is poured onto the solidified fatty cream (FIG. 1E). Hitherto, the tapping operation was carried to release air accumulating between the fatty cream layer and bottom chocolate layer, when the pouring of bottom chocolate is carried out, but the tapping operation should be avoided in the process of invention, since the tapping operation causes leaking of gas from the fatty cream part molten partially through a contact with the hot bottom chocolate base. For preventing a remaining of air at boundary area between the fatty cream layer and bottom chocolate layer, according to the invention, such a chocolate base having viscosity of about 20000 cps or more less to show high fluidity is selected. If such a chocolate base is poured on the fatty cream, it speedy spreads as it were to make unnecessary the tapping operation. The excess amount of the charged bottom chocolate base 7 is scraped off with use of a scraper 8 to recover the same (FIG. 1F).

Figure 3A:
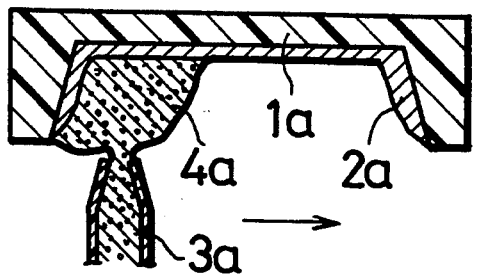
Figure 3B:
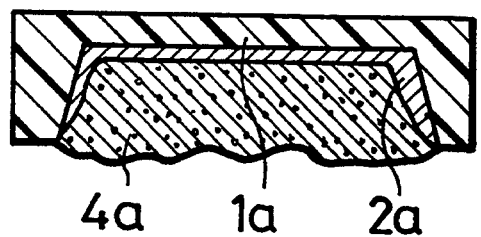
Figure 3C:
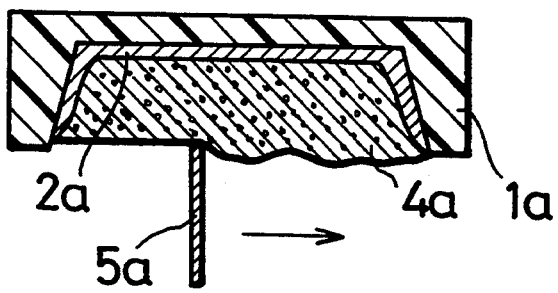
Figure 3D:
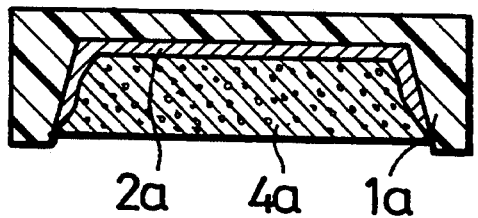

According to the invention, further, the gas bubble entrapping fatty cream can be filled in the shell chocolate with use such a characteristic thereof that the fatty cream has almost no fluidity but has an adhesiveness. Namely, as shown in FIG. 3A-3D, a mold 1a, in which a shell of shell chocolate 2a has been previously formed by adhering a chocolate base on inner surface of the mold and then cooling to cause solidification thereof, was turned in reverse state, the gas bubble entrapping fatty cream 4a is filled in the shell chocolate by utilizing its adhesiveness (FIGS. 3A and 3B), and then excess amount of the fatty cream 4a is scraped off as it were (FIGS. 3C and 3D). In this case, recoveries of the gas bubble entrapping fatty cream continuously discharged from a nozzle 3a in also the case that the nozzle is not used for the adhesive filling of the fatty cream into the shell chocolate and the scraped excess fatty cream can be carried out just under the mold 1a, so that the machine can be made compact. The adhering filling may, of course, be carried out in a stale that the mold 1a is inclined. The mold 1a in reversed or inclined state and with the shell chocolate(s) wherein the gas bubble entrapping fatty cream was filled in constant amount is then turned in normal state. Thereafter, a chocolate base is poured to form a bottom of the shell chocolate, without the tapping operation as referred to above, and then excess amount of bottom chocolate base is scraped off with use of a scraper.

The mold carrying the shell chocolate product is transferred into a cooling device to cause solidification thereof, and then the product were demolded to obtain the desired chocolate confectionery which melts sharply in the mouth, and shows smooth feeling and light taste.

According to another embodiment, a gas bubble entrapping fatty cream prepared by the cooling and stirring type continuous gas dispersing machine is fed to the position of a shell of shell chocolate by a pipe connected to a discharging port of a mixer in the gas dispersing machine.

Figure 2A:
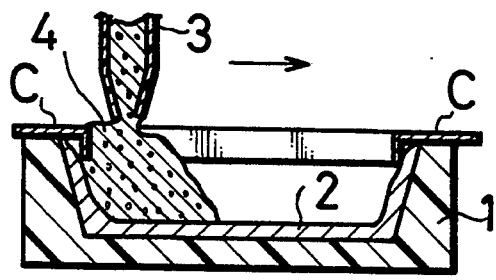
Figure 2B:
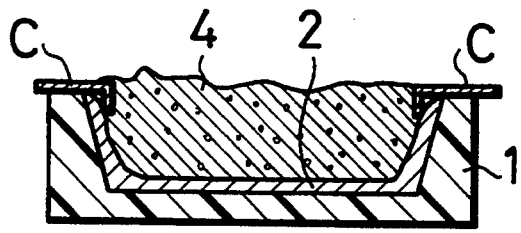
Figure 5:
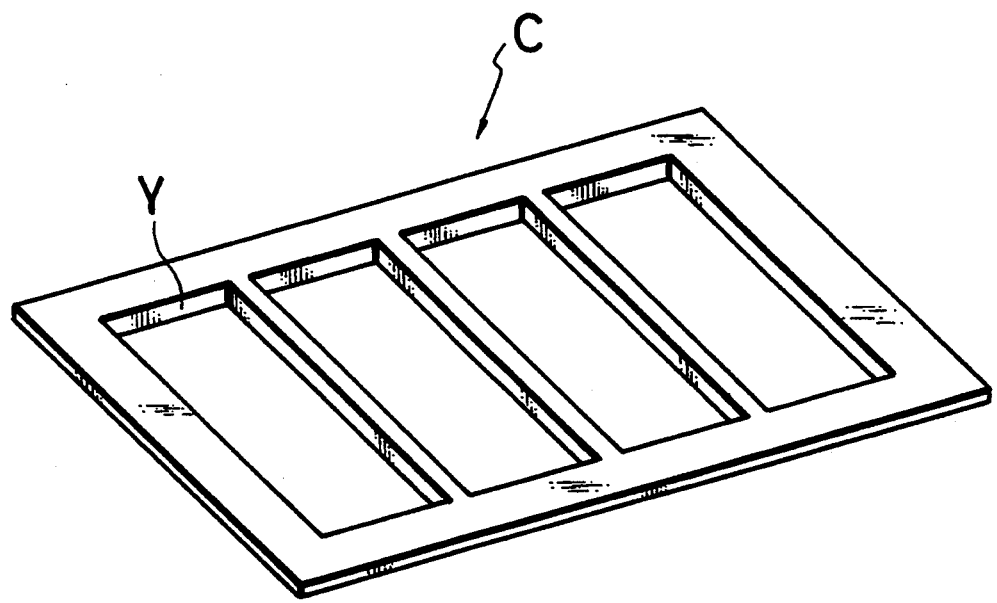
FIG. 5 is a perspective view of the stencil plate to be used for carrying out the second and fourth embodiments.

Then, as shown in FIG. 2A, the gas bubble entrapping fatty cream base 4 is charged under pressure through an aperture of a stencil plate C (this having an visual appearance and structure shown in FIG. 5) into a shell of a shell chocolate 2 with use of a nozzle 3 connected to free end of the pipe to completely fill the inner space of shell with the fatty cream (FIG. 2B). According to this embodiment, the conventional tapping operation is not required, as in the aforesaid embodiments. This means that a specific gravity of the gas bubble entrapping fatty cream is substantially same with that of one just after the preparation in the cooling and stirring type gas dispensing machine.

Figure 2C:
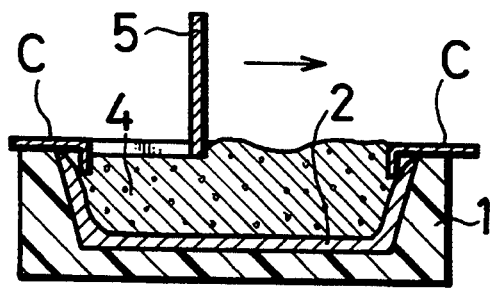
Figure 2D:
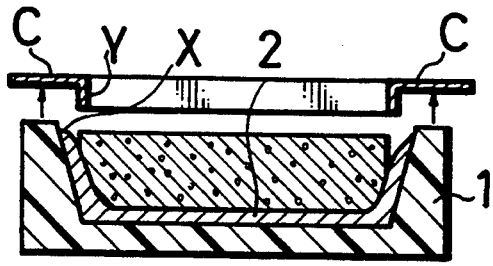

Subsequently, an excess amount of charged gas bubble entrapping fatty cream is scraped off, by such an extent that a space for a bottom chocolate layer to be formed in the subsequent step will remain (FIG. 2C). Then, if the stencil plate C is removed from a mold 1, the inner space of the shell chocolate shows such a state as completely filled with the fatty cream, excepting that there is no fatty cream at edge portion X of the shell chocolate (FIG. 2D). The ground that no fatty cream is present in the edge portion X of the shell chocolate lies in that the edge portion X is covered by a folding portion or flange Y of the stencil plate C, during the charging operation of the fatty cream and the scraping operation of the excessively charged fatty cream, but this provides a favorable effect. Because, if a chocolate base shall be poured in the subsequent step to form a bottom of the shell chocolate for entrapping the fatty cream with the chocolate shell, in a state that the gas bubble entrapping fatty cream adhered to the edge portion X of the shell chocolate, even though an amount of the adhering fatty cream is small, a thickness of the bottom chocolate is apt to be reduced at the edge portion, which may cause a crack at that portion in the subsequent cooling step, and there is such a possibility during a circulation of the final products that since, in general, melting point of the fatty cream is remarkably low than that of the shell and bottom chocolates, the fatty cream adhered on the edge portion of the shell chocolate causes partial melting and as a result, to cause a peeling off of the bottom chocolate at the edge portion of the shell chocolate.

Figure 2E:
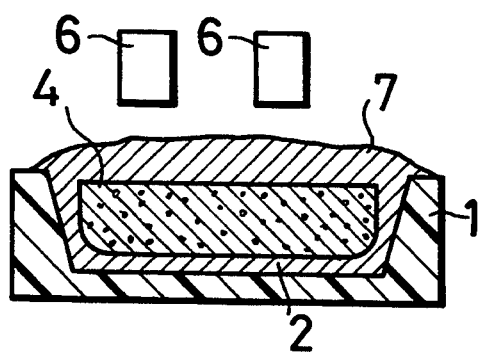
Figure 2F:
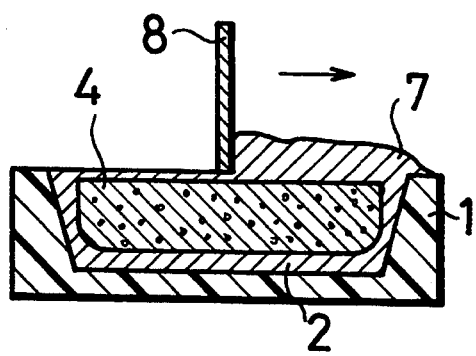
Figure 2G:
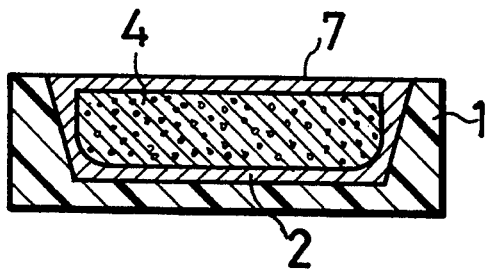

The shell chocolate filled with the gas bubble entrapping fatty cream is transferred into a cooling device as it were, if necessary to cause solidification of the fatty cream. For increasing adhesiveness between the shell chocolate and bottom chocolate, thereafter, an end portion of the shell chocolate 2 is partially molten with use of a heater, and then a chocolate base 7 for the bottom chocolate is poured on the solidified fatty cream with use of a pouring nozzle 6 (FIG. 2E). Also in this embodiment, the chocolate base having viscosity of about 20000 cps or more less and rich in fluidity is selected to avoid the necessity of tapping operation, as in the preceding embodiments. An excess amount of the bottom chocolate base is scraped off for its recovery (FIG. 2F).

Figure 4A:
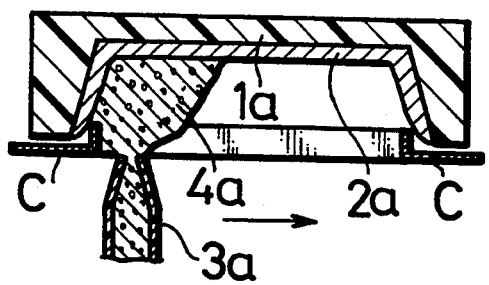
Figure 4B:
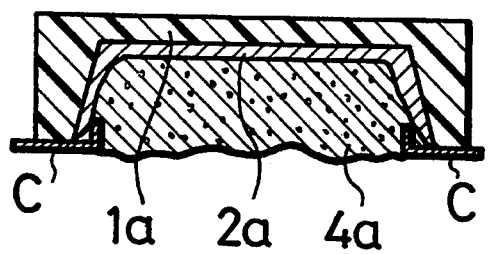
Figure 4C:
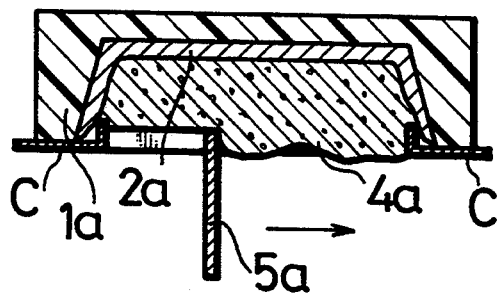
Figure 4D:
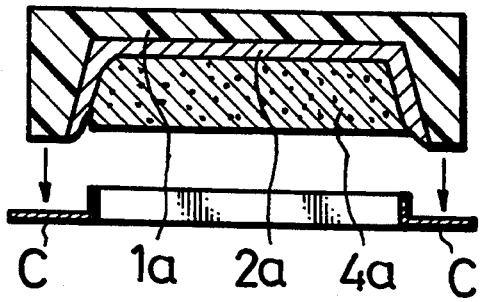

As a modification of the above embodiment, there is a process for adhesively filling the shell chocolate with the gas bubble entrapping fatty cream, which utilizes such characteristics of the fatty cream that it has almost no fluidity but has an adhesiveness. Namely, as shown in FIG. 4A–4B, a mold 1a, in which a shell of shell chocolate 2a has been previously formed by adhering a chocolate base on inner surface of the mold and then cooling to cause solidification thereof, was turned in reverse state together with a stencil plate C abutting thereto, the gas bubble entrapping fatty cream 4a is filled in the shell chocolate by utilizing its adhesiveness (FIGS. 3A and 3B), and then excess amount of the fatty cream 4a is scraped off as it were (FIGS. 4C and 4D). In this case, recoveries of the gas bubble entrapping fatty cream continuously discharged from a nozzle 3a in also the case that the nozzle is not used for the adhesive filling of the fatty cream into the shell chocolate and the scraped excess fatty cream can be carried out just under the mold 1a, so that the machine can be made compact. The adhering filling may, of course, be carried out in a state that the mold 1a is inclined. The mold 1a in reversed or inclined state and with the shell chocolate(s) wherein the gas bubble entrapping fatty cream was filled in constant amount is then turned in normal state to remove the stencil plate C. Thereafter, a chocolate base is poured to form a bottom of the shell chocolate, without the tapping operation, and then excess amount of the bottom chocolate base is scraped off with use of a scraper.

The mold carrying the shell chocolate product is transferred into the cooling device to cause solidification thereof, and then the products were demolded to obtain the desired chocolate confectionery which melts sharply in the mouth, and shows smooth feeling and light taste.

The invention will be further explained in more concretely with reference to actual Examples.

Each value of specific gravities given in the Examples was obtained through a weighing of gas bubble entrapping fatty cream filled in a cup of constant volume, when the fatty cream is not solidified, or measured by a air comparative gravimeter (Type 930, manufactured by Beckman Co.), when it is solidified. While, a size of gas bubbles was measured by freezing the gas bubble entrapping fatty cream to $-100°$ to $-150°$ C. with use of liquid nitrogen and using a scanning type electron microscope (Type S-570, manufactured by Hitachi Ltd.).

Example 1

A mixture consisting of cacao mass 10.0 parts by weight, sugar 26.4 parts by weight, lactose 5.0 parts by weight, whole milk powder 20.0 parts by weight, cocoa butter (melting point:35° C.) 22.5 parts by weight, vegetable fat (melting point:30° C.) 13.0 parts by weight, butter oil (milk curd) 2.0 parts by weight, emulsifier 1.0 part by weight and flavor 0.1 part by weight was milled with use of a roller mill in a conventional manner, and the resulting material was subjected to conching process to obtain a fatty confectionery base. To the fatty confectionery base 91.2 parts by weight and at about 35° C., fresh cream (water content 67.0% by weight, and content of milk curd:25.0% by weight and liquor (alcohol content; 40.0% by weight, and extract content:15.0% by weight) 2.0 parts by weight were added and mixed to prepare a fatty cream base. The fatty cream base shows electrical resistance value of more than 30 megaohms at 15.0 mm of electrode interval, and is w/o type emulsion.

On the other hand, a commercially available milk chocolate ("Meiji Twincle Chocolate", trademark) molten and subjected to a conventional tempering treatment was poured into a mold of polycarbonate [60.0 (W)×155,0 (L)×10.0 (D) mm, tapered angle:8 degrees]. After giving vibration to the mold, the mold was turned in a reverse state to discharge an excess amount of the milk chocolate base, and the mold was cooled to form a shell chocolate having thickness of about 1.7 mm on inner wall surface of the mold.

The fatty cream base adjusted its temperature to about 28° C. was continuously supplied by a pump at a rate of about 25 kg/hour to a cooling and stirring type continuous gas dispersing machine of MINI-MONDO (Type A05, and manufactured by Mondo mix Co.) which has a jacket to circulate brine therethrough and rotates at about 700 rpm and further, nitrogen gas was fed to the MINI-MONDO at a rate of 550–600 ml/minute to continuously prepare a gas bubbles entrapping fatty cream base with porous structure, which has temperature of 23° C., specific gravity of 0.45 and uniformly dispersed fine gas bubbles having diameter of about 0.3 mm or more less.

A synthetic plastic hose having inner diameter of 35.0 mm with at free end thereof a nozzle of 6.0 (W)×55.0 (L) mm was connected to a discharge port of the MINI-MONDO and the gas bubbles entrapping fatty cream base was fed under pressure into a shell of the shell chocolate to fill inner space of the shell with the fatty cream, while moving the nozzle in the shell. The gas bubble entrapping fatty cream base filled in the shell chocolate had specific gravity of 0.47 and completely maintained the porous structure, and in which fine gas bubbles are uniformly dispersed.

Without any tapping operation, an excess amount of the gas bubble entrapping fatty cream base was scraped off with use of a scraper which is able to scrape out in depth of 2.5 mm from outer surface of the mold to make flat the outer surface of fatty cream base layer. The shell chocolate filled with the fatty cream base in constant amount (about 22 g) was cooled for 2 minutes at about 8° C., and then upper end of the shell chocolate was heated by irradiating infrared rays to cause partial melting thereof. The aforesaid milk chocolate base previously adjusted to a viscosity of 15000 cps (30° C.) at after tempering treatment, by adding cocoa butter was, at once, poured on the fatty cream in the shell chocolate without any tapping operation, and then scraped off excessively charged chocolate base to form a bottom of the shell chocolate, which bottom is of about 2.0 mm in thickness.

The mold carrying the shell chocolate entrapping the fatty cream with fine gas bubbles therein was transferred to a cooling device, wherein cooled air of 10°–15° C. circulates, and maintained therein for 15 minutes to cause solidification of the chocolate confectionery, and then demolded to obtain the desired product.

The chocolate confectionery was sharply molten in the mouth to show smooth and light taste.

Example 2

A mixture consisting of cacao mass 10.0 parts by weight, sugar 26.4 parts by weight, lactose 5.0 parts by weight, whole milk powder 20.0 parts by weight, cocoa butter (melting point:35° C.) 22.5 parts by weight, vegetable fat (melting point:30° C.) 13.0 parts by weight, butter oil (milk fat) 2.0 parts by weight, emulsifier 1.0 part by weight and flavor 0.1 part by weight was milled with use of a roller mill in a conventional manner, and the resulting material was subjected to conching process to obtain a fatty confectionery base. To the fatty confectionery base 91.2 parts by weight and at about 35° C., fresh cream (water content:67.0% by weight, and content of milk fat:25.0% by weight) 6.8 parts by weight and liquor (alcohol content; 40.0% by weight, and extract content:15% by weight) 2.0 parts by weight were added and mixed to prepare a fatty cream base.

The fatty cream base shows electrical resistance value of more than 30 megaohms at 15.0 mm of electrode interval, and is w/o type emulsion.

On the other hand, a commercially available milk chocolate ("Meiji Twincle Chocolate". trademark) molten and subjected to a conventional tempering treatment was poured into a mold of polycarbonate [61.5 (W)×160.0 (L)×15.0 (D) mm, tapered angle:8 degrees]. After turned the mold in reverse side and giving vibration thereto to discharge an excess amount of the milk chocolate base, and the mold was cooled to form a shell chocolate having thickness of about 1.7 mm on inner wall surface of the mold.

A stencil plate which is made of stainless steel plate of 1 mm in thickness, has an aperture of 53.5 (W)×152.0 (L) mm and a folded portion or flange of 5.5 mm in width and arranged around the aperture was so placed on the mold carrying the shell chocolate that the flange lies in the shell of shell chocolate.

The fatty cream base adjusted its temperature to about 28° C. was continuously supplied by a pump at a rate of about 25 kg/hour to a cooling and stirring type continuous gas dispersing machine of MINI-MONDO (Type A05, and manufactured by Mondo mix Co.) which has a jacket to circulate brine therethrough and rotates at about 700 rpm and further, nitrogen gas was fed to the MINI-MONDO at a rate of 550–600 ml/minute to continuously prepare a gas bubbles entrapping fatty cream base with porous structure, which has temperature of 23° C., specific gravity of 0.45 and uniformly dispersed fine gas bubbles having diameter of about 0.3 mm or more less.

A synthetic plastic hose having inner diameter of 35.0 mm with at free end thereof a nozzle of 6.0 (W)×55.0 (L) mm was connected to a discharge port of the MINI-MONDO and the gas bubble entrapping fatty cream base was fed under pressure into a shell of the shell chocolate through the aperture of the stencil plate to fill inner space of the shell with the fatty cream, while moving the nozzle in the shell. The gas bubble entrapping fatty cream base filled in the shell chocolate had specific gravity of 0.47 and completely maintained the porous structure, and in which fine gas bubbles are uniformly dispersed.

Without any tapping operation, an excess amount of the gas bubble entrapping fatty cream base was scraped off with use of a scraper which is able to scrape out in depth of 9.0 mm from outer surface of the stencil plate to make flat the outer surface of fatty cream base layer.

After removed the stencil plate, the shell chocolate filled with the fatty cream base was cooled for 2 minutes at about 8° C. to cause solidification of the fatty cream, and then upper end of the shell chocolate was heated by irradiating infrared rays to cause partial melting thereof. The aforesaid milk chocolate base previously adjusted to a viscosity of 15000 cps (30° C.) at after tempering treatment, by adding cacao butter was, at once, poured on the fatty cream in the shell chocolate without any tapping operation, and then scraped off excess amount of the chocolate base to form a bottom of the shell chocolate, which bottom is of 2.0 mm in thickness. The mold carrying the shell chocolate which entraps the fatty cream with fine gas bubbles therein was transferred to a cooling device, wherein cooled air of 10°–15° C. circulates, and maintained therein for 15 minutes to cause solidification of the chocolate confectionery, and then demolded to obtain the desired product.

The resulting chocolate confectionery was sharply molten in the mouth to show smooth and light taste.

What is claimed is:

1. A process for the manufacture of chocolate confectionery entrapping fatty cream with fine gas bubbles therein, comprising the steps of:

forming a shell of chocolate by adhering an initially molten chocolate base on the inner wall of a mold in an initial upright position, turning the mold to a position generally opposite the initial upright position to discharge an excess amount of the molten chocolate base, cooling the molten chocolate shell to cause solidification thereof, feeding under pressure a fatty cream base with uniformly dispersed gas bubbles therein into said shell of chocolate, wherein said fatty cream with gas bubbles has a specific gravity of 0.35–0.80 and the gas bubbles are less than 0.3 mm diameter, and wherein said fatty cream base shows fluidity, removing without a tapping operation excess fatty cream base from said shell of chocolate, cooling the fatty cream base in said shell of chocolate to cause solidification thereof, pouring a further molten chocolate base on the fatty cream base in said shell of chocolate to encapsulate said fatty cream base, cooling the further molten chocolate base to cause solidification thereof, and unmolding the resulting product.

2. The process according to claim 1, wherein excess further molten chocolate base is removed before cooling.

3. The process according to claim 1 wherein the shell of chocolate is returned to the initial upright position before said fatty cream base is fed into said shell of chocolate.

4. The process according to claim 1 wherein the fatty cream base is fed under pressure into the shell of chocolate while the mold is in a position generally opposite the initial upright position and the mold is returned to the initial upright position after the excess fatty cream base has been removed.

5. The process according to claim 1 wherein the fatty cream base is fed under pressure into the shell of chocolate while the mold is inclined, and the mold is returned to the initial upright position after the excess fatty cream base has been removed.

6. A process for the manufacture of chocolate confectionery entrapping fatty cream with fine gas bubbles therein, comprising the steps of:

forming a shell of chocolate by adhering a molten chocolate base on the inner wall of a mold in an initial upright position, turning the mold to a position generally opposite the initial upright position to discharge an excess amount of the molten chocolate base, cooling the molten shell of chocolate to cause solidification thereof, placing a stencil plate over the shell of chocolate in a position such that a stencil aperture is fitted to an opening in the chocolate shell, uniformly dispersing fine gas bubbles throughout a fatty cream base with a cooling and stirring type continuous gas dispersing machine, feeding under pressure, through the aperture of the stencil plate, the fatty cream base with uniformly dispersed gas bubbles therein, into said shell of chocolate, wherein said gas bubble entrapping fatty cream base has a specific gravity of 0.35–0.80 and the gas bubbles are less than 0.3 mm diameter, and wherein said fatty cream base shows fluidity, removing without a tapping operation excess fatty cream base from said shell of chocolate to a constant depth, removing said stencil plate from the mold, cooling the fatty cream base in said shell of chocolate to cause solidification thereof, pouring a further molten chocolate base on the fatty cream base in said shell of chocolate to encapsulate said fatty cream base, cooling the further molten chocolate base to cause solidification thereof, and unmolding the resulting product.

7. The process according to claim 6, wherein excess further molten chocolate base is removed before cooling.

8. The process according to claim 6 wherein the stencil aperture has a flange defining the aperture so that when the stencil plate is mounted on said mold, the flange is fitted in the chocolate shell.

9. The process according to claim 6, wherein the fatty cream base is fed under pressure into the shell of chocolate after the mold with said stencil plate mounted thereon is returned to the initial upright position.

10. The process according to claim 6, wherein the fatty cream base is fed under pressure into the shell of chocolate while the mold with said stencil plate mounted thereon is in a position generally opposite the initial upright position and the mold is returned to the initial upright position after the excess fatty cream base has been removed.

11. The process according to claim 6, wherein the fatty cream base is fed under pressure into the shell of chocolate while the mold with said stencil plate mounted thereon is inclined, and the mold is returned to the initial upright position after the excess fatty cream base has been removed.

* * * * *